UNITED STATES PATENT OFFICE.

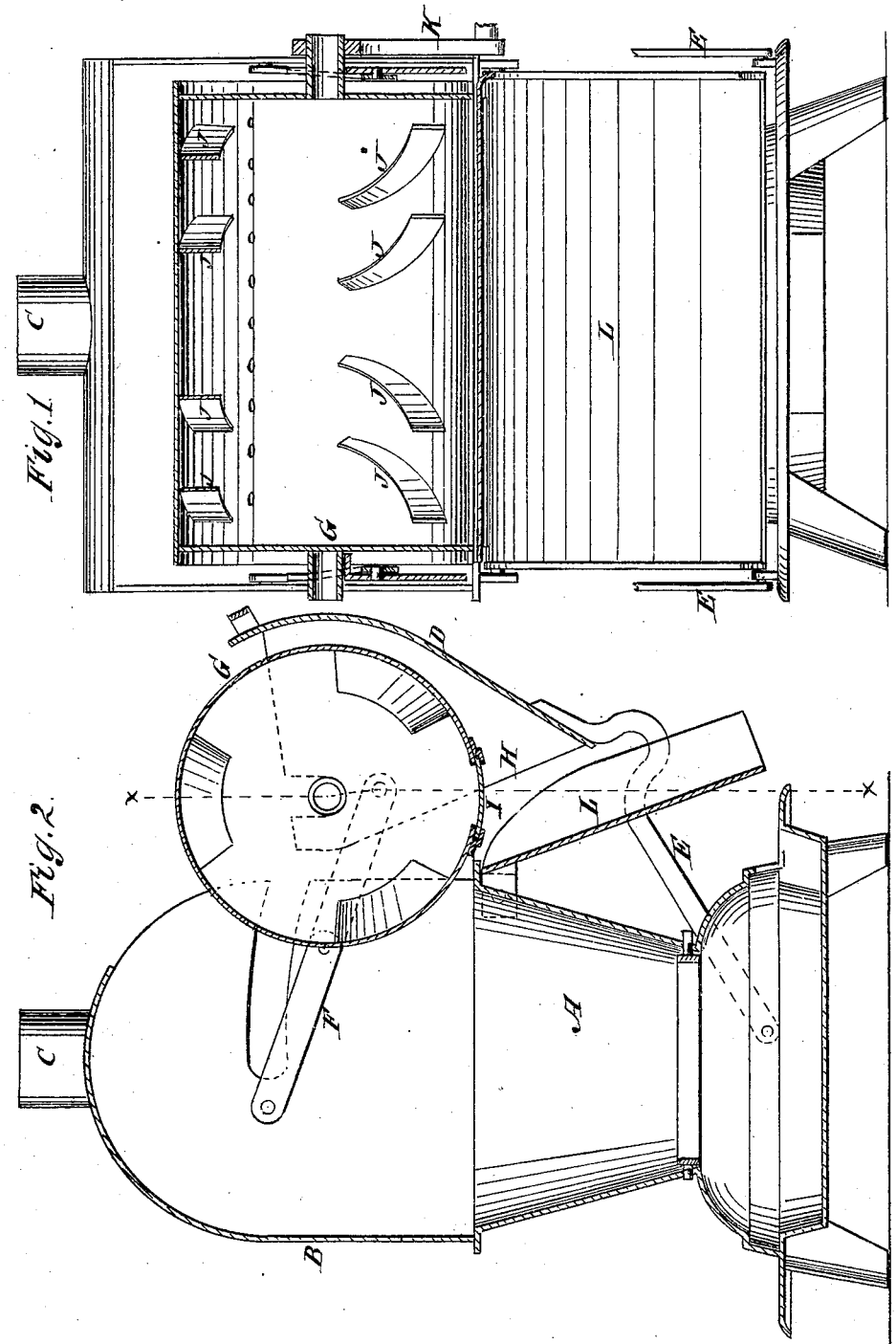

WILLIAM J. LANE, OF MILLBROOK, NEW YORK, ASSIGNOR TO HIMSELF AND JOHN G. LANE, OF SAME PLACE.

IMPROVEMENT IN COFFEE-ROASTERS.

Specification forming part of Letters Patent No. 145,576, dated December 16, 1873; application filed October 18, 1873.

*To all whom it may concern:*

Be it known that I, WILLIAM J. LANE, of Millbrook, in the county of Dutchess and State of New York, have invented a new and useful Improvement in Coffee-Roasters, of which the following is a specification:

The invention will first be fully described, and then pointed out in the claims.

In the accompanying drawing, Figure 1 represents a vertical section taken on the line $x$ $x$ of Fig. 2. Fig. 2 is an end elevation, showing the stove-drum opened and the roasting-cylinder in a position to discharge the roasted coffee.

Similar letters of reference indicate corresponding parts.

A is the fire pot or box of an ordinary heating-stove. B is the drum thereof, which drum receives the smoke and gaseous products of combustion, which are discharged from the top through the pipe C. This drum is made of rectangular or other convenient form, and one side, D, is attached by hinges E, so that it drops back, as seen in Fig. 2, and is limited in its backward movement by the joint-strap F at each end. G is the cylinder, into which the coffee is put for roasting. This cylinder is revolved on central gudgeons supported by ears H. (Seen in dotted lines in Fig. 2.) One or both of these gudgeons may be hollow, through which the coffee in the cylinder may be inspected from time to time to determine its condition. The hollow gudgeons (one or both) are closed by stoppers of any suitable kind while the cylinder is revolving. I is a slide, which, when removed, allows the coffee to be introduced into and removed from the cylinder. On the inner surface of the cylinder is a series of wings or flanges, J, either straight or curved, set diagonally, and so arranged that as the cylinder is revolved the coffee in contact with the surface of the cylinder is constantly being carried from the ends toward the middle, where the heat is greatest, and, rising in the middle, flows by virtue of its own gravity toward the ends again, and thus all the kernels are equally exposed, and the mass roasted uniformly. While the cylinder is being revolved, and the roasting operation being performed, the hinged side D is closed up to the drum, thus inclosing the roasting-cylinder. K is the crank, attached to one of the gudgeons, by which the cylinder is revolved. The end of the drum is slotted, which allows this gudgeon to pass to the center of the drum. This slot is closed by the ear H. L is an apron, which is hinged to ears on the bottom of the drum. When the coffee is sufficiently roasted, the side is drawn back, as seen, and the cylinder is turned, so that by removing the slide I the coffee will be discharged onto the apron, and disposed of as may be desired.

When not required for roasting coffee, the roasting-cylinder may be removed and the drum closed up, which adapts the drum and stove for general heating purposes.

Fuel is supplied by opening the drum, and may be introduced when the cylinder is in place, if desired.

This roaster is more especially designed for dealers in coffee, where it is desired to roast it often, and have it fresh for customers at all times.

Having thus described my invention, I claim as new and desire to secure by Letters Patent—

1. A coffee-roaster, A B, and cylinder G, having a hinged side, D, constructed and limited in its movement by joint-straps F F as described, whereby the cylinder and side of case are withdrawn by a single movement, for discharging and refilling.

2. The cylinder G, journaled in a pivoted case-side, D, as and for the purpose described.

WILLIAM J. LANE.

Witnesses:
   T. B. MOSHER,
   ALEX. F. ROBERTS.